April 7, 1931.　　H. W. SCHRADER　　1,799,869

ENGINE BLOCK

Filed Nov. 12, 1928

INVENTOR.
Henry W. Schrader.
BY
　　　　　　ATTORNEY

Patented Apr. 7, 1931

1,799,869

UNITED STATES PATENT OFFICE

HENRY W. SCHRADER, OF MARTINS FERRY, OHIO, ASSIGNOR OF ONE-THIRD TO ELMER KRIEGER, OF MARTINS FERRY, OHIO

ENGINE BLOCK

Application filed November 12, 1928. Serial No. 318,618.

My invention relates to a new and useful improvement in an engine block adapted for use with an internal combustion engine in which a piston is reciprocally mounted in a cylinder.

It is an object of the present invention to provide a liner member insertable in the cylinder which will serve as a bearing for the pistons and permit the removal of the engine head without disturbing the piston rings when the pistons are at their upper position of movement.

Another object of the invention is the provision in an engine block of a removable member whereby the piston rings may be easily and quickly removed and replaced.

Other objects will appear hereinafter.

The invention consists in the combination and arrangement of parts hereinafter described and claimed.

Figure 1:
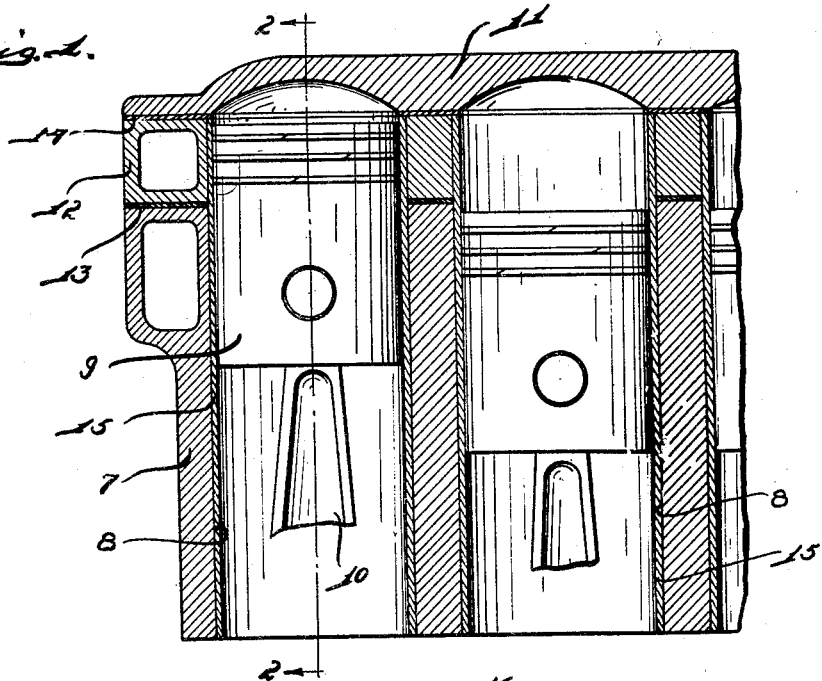

The invention will be best understood from a reference to the accompanying drawings which form a part of this specification and in which, Fig. 1 is a fragmentary central sectional view of the invention.

Figure 2:
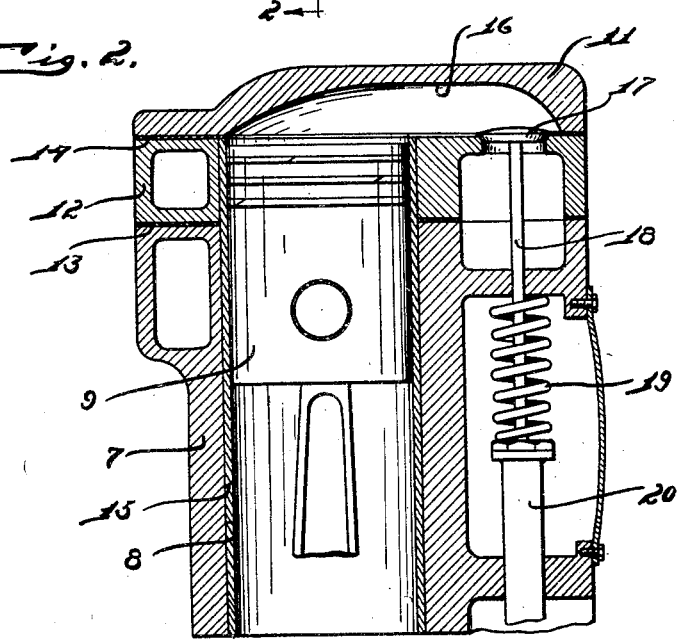

Fig. 2 is a view taken on line 2—2 of Fig. 1.

The engine block comprises the cylinder bearing portion 7 in which are formed cylinders 8 for reception of the pistons 9 which are connected to the connecting rods 10. A detachable head 11 is mounted on the section 12, suitable gaskets being positioned between the block 7 and the section 12 and a similar gasket 14 being positioned between the cover or head 11 and the section 12. Inserted in each of the cylinders 8 is a cylinder 15 which serves as a bearing for the piston 9 and which extends to the upper part of the block terminating flush with the communication of the combustion chamber 16 with the cylinder 8. The usual valve 17 with the valve stem 18, spring 19 and push rod 20 are illustrated.

With a removable sleeve or cylinder 15 inserted in the cylinders in the manner indicated, permanent scoring of the cylinder is eliminated as a smooth bearing for the piston is afforded and these cylinder liners may be removed at will. By removing the covering 11 and the section 12, the sleeve 15 may be moved to a position to uncover the piston 9 partially or completely, as desired, and by uncovering the piston partially the piston rings may be easily inserted in position or removed. In this way the removal and replacement of the piston rings is facilitated by the structure. It is believed obvious that the head 11 and the section 12 may be easily and quickly removed without disturbing the piston rings.

While I have illustrated and described the preferred form of my invention, I do not wish to limit myself to the precise details of structure shown but desire to avail myself of such variations and modifications as come within the scope of the appended claim.

Having thus described my invention what I claim as new and desire to secure by Letters Patent is:

An engine block of the class described comprising: a cylinder bearing portion; a section positioned on said portion and having an opening aligned with the cylinder opening formed in said cylinder bearing portion and forming an extension of said cylinder; and a cover on said section; and a removable sleeve positioned in said cylinder and extending to the upper edge of said section.

In testimony whereof I have signed the foregoing specification.

HENRY W. SCHRADER.